United States Patent
Shiau

(10) Patent No.: US 6,783,352 B2
(45) Date of Patent: Aug. 31, 2004

(54) WAX LIQUID TEMPERATURE CONTROL DEVICE OF WAX INJECTOR

(76) Inventor: Yu-Sheng Shiau, No. 10, Lane 172, Chun Ying St., Shu Lin, Taipei Hsien (TW)

(*) Notice: Subject to any disclaimer, the term of this patent is extended or adjusted under 35 U.S.C. 154(b) by 269 days.

(21) Appl. No.: 09/969,182

(22) Filed: Oct. 3, 2001

(65) Prior Publication Data

US 2003/0064125 A1 Apr. 3, 2003

(51) Int. Cl.[7] .............................. B29C 35/02; F28F 1/36
(52) U.S. Cl. ...................... 425/547; 165/184; 425/558
(58) Field of Search ............................... 425/542, 547, 425/549, 143, 558; 165/184

(56) References Cited

U.S. PATENT DOCUMENTS

| | | | |
|---|---|---|---|
| 2,680,883 A | * 6/1954 | Ashbaugh | 425/166 |
| 4,396,133 A | * 8/1983 | Glaser | 222/334 |
| 4,444,704 A | * 4/1984 | Hira et al. | 264/45.5 |
| 4,922,996 A | * 5/1990 | Rees | 165/1 |
| 4,934,918 A | * 6/1990 | Outland | 425/144 |
| 4,971,547 A | * 11/1990 | Nett, Jr. et al. | 425/135 |
| 6,136,236 A | * 10/2000 | Boccard et al. | 264/40.1 |

* cited by examiner

*Primary Examiner*—W. L. Walker
*Assistant Examiner*—Emmanuel Luk
(74) *Attorney, Agent, or Firm*—Varndell & Varndell, PLLC

(57) ABSTRACT

A wax liquid temperature control device of a wax injector is disclosed. In this device, a coal oil heat exchanger controls the temperature of the coal oil in a predetermined range. Then, the coal oil is transferred to a wax liquid temperature control cylinder to control the temperature of the wax liquid so that the wax liquid is retained in a proper temperature for being injected to a mold. Therefore, the wax liquid temperature control device of a wax injector may cool the wax liquid in the mold rapidly.

6 Claims, 5 Drawing Sheets

WAX LIQUID TEMPERATURE CONTROL DEVICE OF WAX INJECTOR

BACKGROUND OF THE INVENTION 1. (a) Field of the Invention

The present invention relates to a wax liquid temperature control device of a wax injector, and particularly to a wax liquid temperature control device of a wax injector, wherein coal oil is circularly transferred to control the wax liquid injecting into a mold. Thereby, wax liquid in the mold is cooled rapidly.

2. (b) Description of the Prior Art

In the prior wax injector, a wax storage tank is used to store melt wax liquid. Thereby, as wax is injected, the melted wax liquid is sucked by the wax injecting cylinder and then the wax liquid is injected to a mold. Then the wax liquid is cooled in the mold and then is taken out so as to form a wax product. However, in this method, the injecting wax liquid must be retained in a proper temperature so that the operation can be successful. The wax liquid in the wax storage tank having a proper high temperature. After the high temperature wax liquid is injected into the mold, a longer cooling time is required for opening the mold. Therefore, the injection work is slow. If the wax liquid in the wax storage tank is low, although the wax can be shaped in the mold, the wax liquid can not be filled in the mold completely. Especially, the holes of the molds are smaller, and the wax liquid can not fill the holes completely so that the products have defects.

SUMMARY OF THE INVENTION

Accordingly, the primary object of the present invention is to provide a wax liquid temperature control device of a wax injector, wherein a coal oil heat exchanger control the coal oil in a lower temperature condition. Then the low temperature coal oil is transferred to a wax liquid temperature control cylinder to reduce the temperature of the wax liquid. When the temperature of the wax liquid is too low, the coal oil heat exchanger sucks the high temperature coal oil in the wax storage tank to heat the low temperature coal oil so that the temperature of the coal oil increases to a proper temperature and then is transferred to the wax liquid temperature control cylinder for heating. Therefore, the wax liquid is retained in a proper temperature for being injected into a mold. Therefore, the wax liquid will fill the mold completely.

Another object of the present invention is to provide a wax liquid temperature control device of a wax injector, wherein the coal oil heat exchanger has a water tube which is connected to a water storage tank. Thereby, cooling water may be sucked for cooling coal oil. Thereby, the coal oil can be transferred to a wax liquid temperature control cylinder for reducing the temperature of the wax liquid.

A further object of the present invention is to provide a wax liquid temperature control device of a wax injector, wherein if the temperature of the coal oil is too high, in the present invention, the temperature sensor serves to measure the temperature of the coal oil for controlling the electromagnetic valve to switch the pump. Thereby, cooled water is transferred to the coal oil heat exchanger for reducing the temperature of the coal oil.

DETAILED DESCRIPTION OF THE PREFERRED EMBODIMENTS

Figure 1:
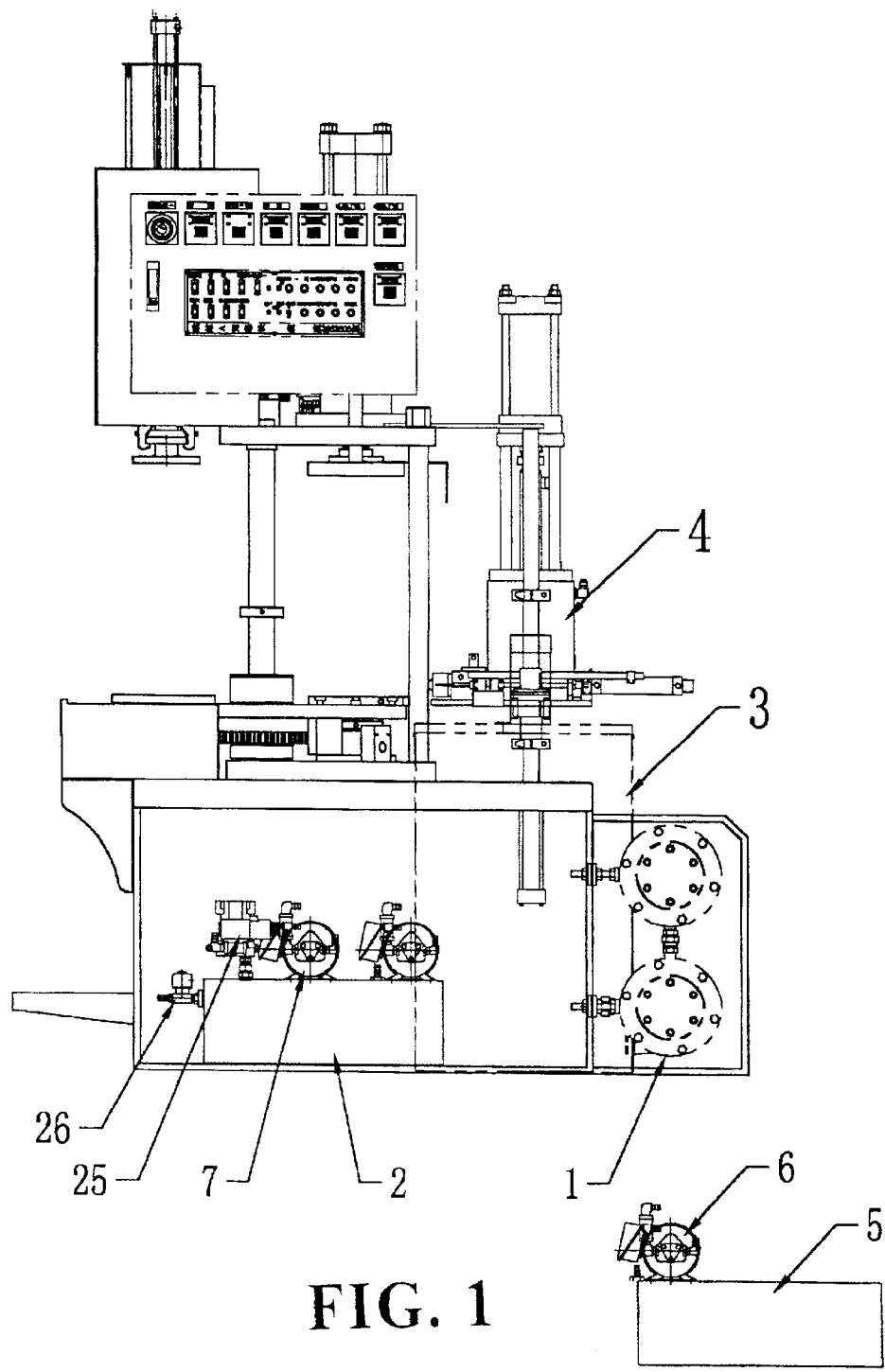
FIG. 1 is a schematic view showing that the present invention is utilized to an wax injector.
Figure 2:
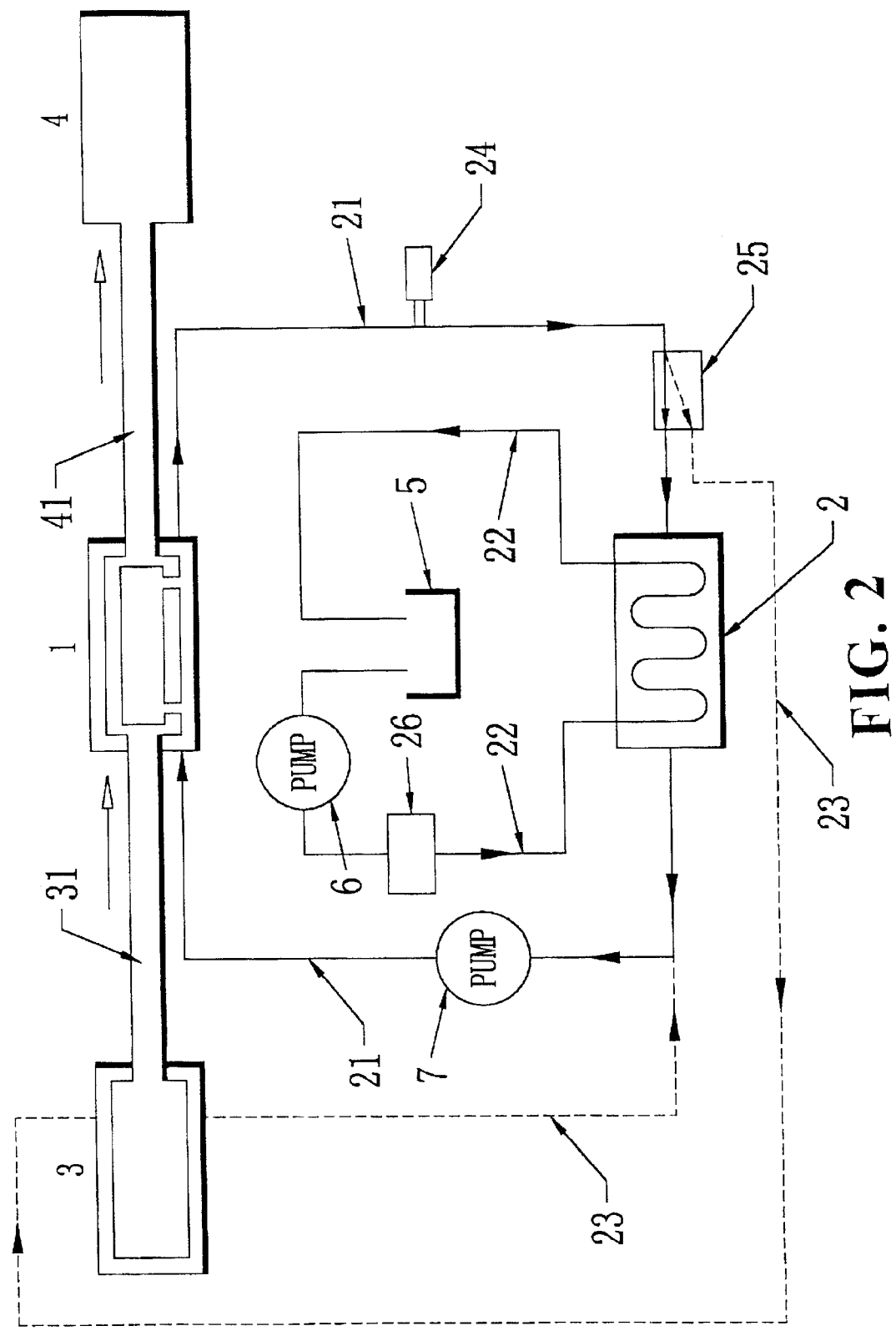
FIG. 2 is a schematic view showing the pipelines and flows of the present invention.

Referring to FIGS. 1 and 2, the wax injecting device of the present invention is illustrated. The wax injecting device includes a wax liquid temperature control cylinder 1, a coal oil heat exchanger 2, a wax storage tank 3, a wax injecting cylinder 4, and a water storage tank 5. The coal oil (or other liquid) is used as a medium for heat exchanging.

Figure 3:
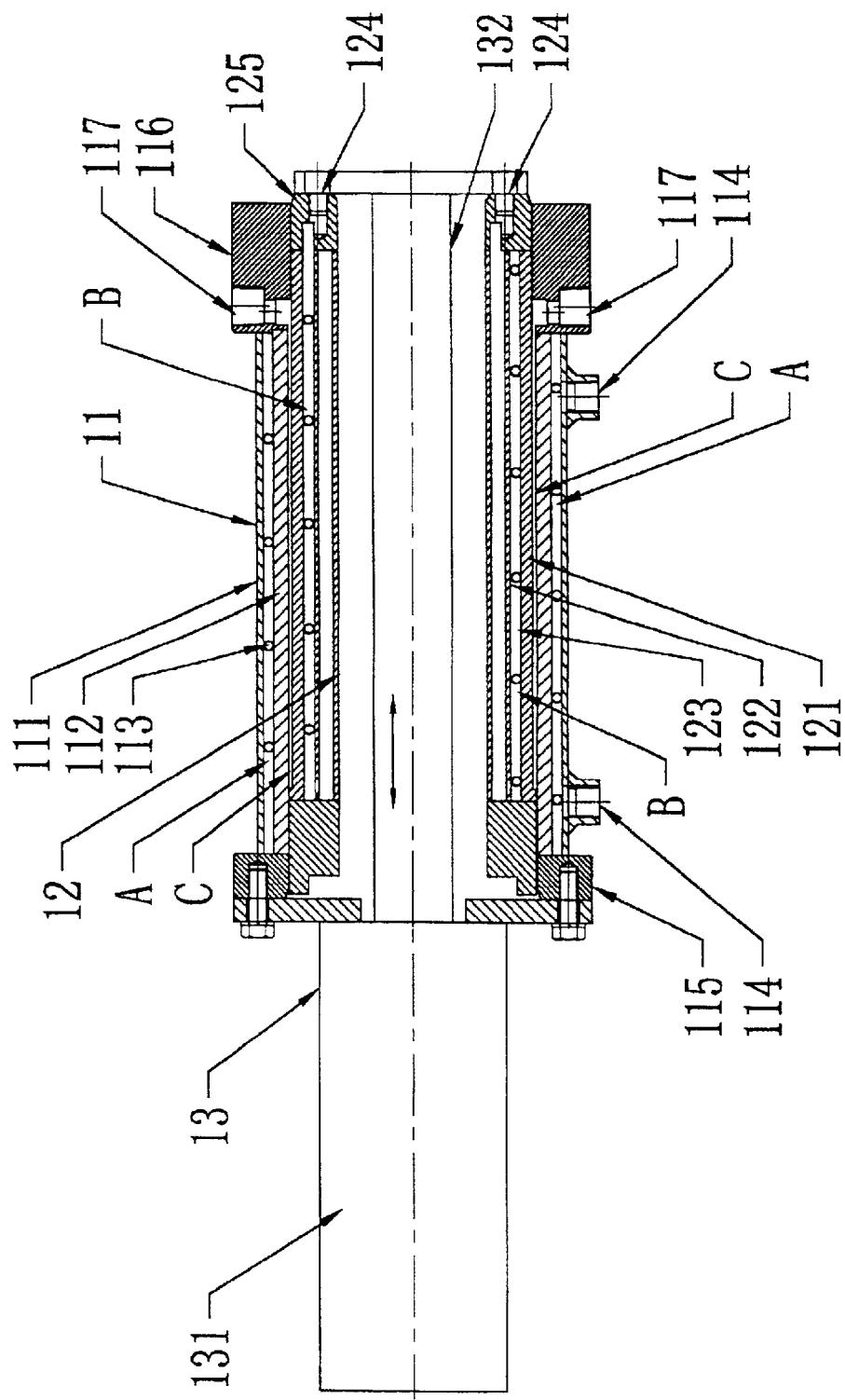
FIG. 3 is a schematic view showing the wax liquid temperature control cylinder of the present invention.
Figure 4:
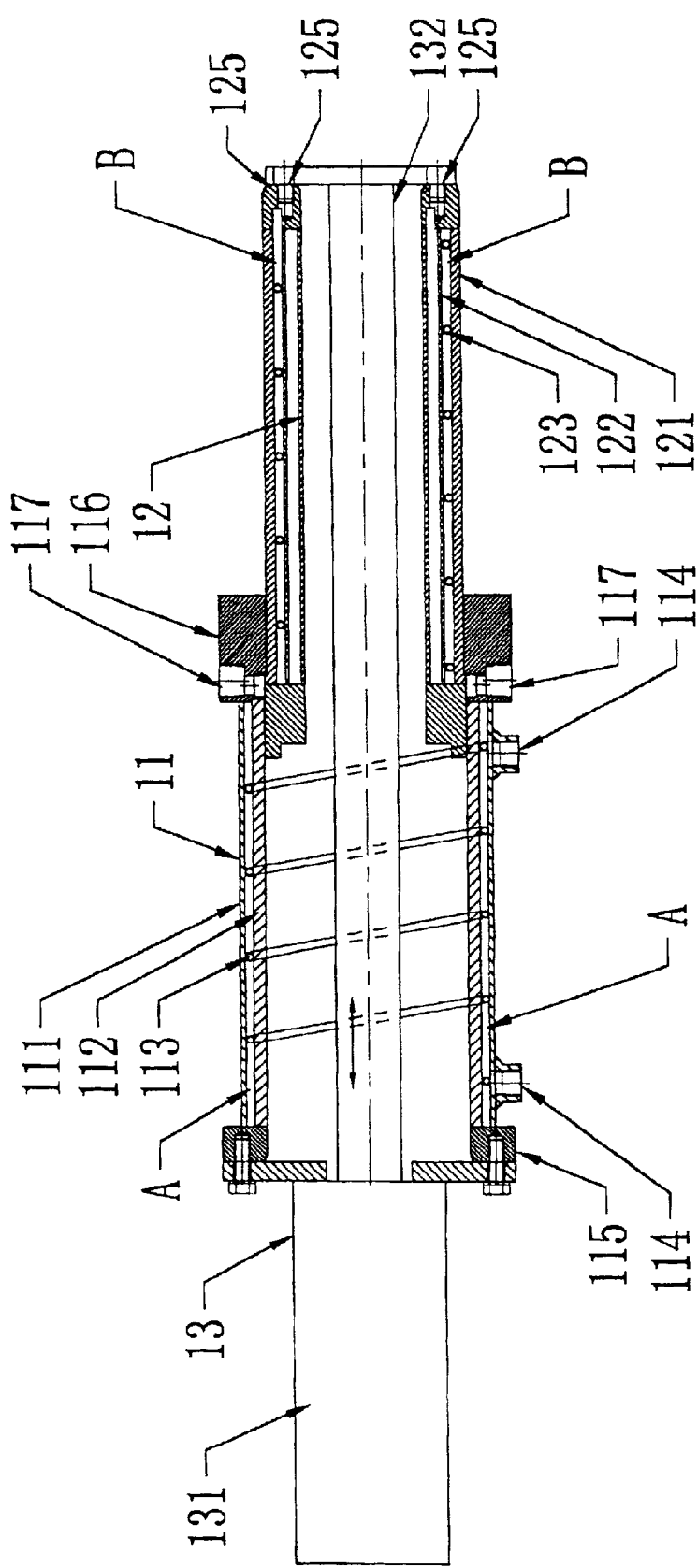
FIG. 4 is a schematic view showing that the wax liquid temperature control cylinder of the present invention is prolonged.

With reference to FIGS. 3 and 4, the wax liquid temperature control cylinder 1 is a device for sucking wax liquid from a wax storage tank 3 for providing the wax injecting cylinder 4. The interior of the wax liquid temperature control cylinder 1 is installed with a helical flow channel for providing wax liquid for cooling the coal oil or heating. The wax liquid temperature control cylinder 1 includes an outer cylinder body 11, an inner cylinder body 12, and a linear moving means 13.

The outer cylinder body 11 has an outer barrel body 111. The interior thereof is installed with an inner barrel body 112. The periphery of the inner barrel cylinder 112 is enclosed by a helical ring 113 so that a helical flow channel A is formed between the two barrel bodies. The lateral wall of the outer barrel body 111 is formed with two coal oil opening 114 which is communicated with the two ends of the flow channel A. The rear end thereof has a sealing block 115 so that the rear ends of the two barrel bodies are sealed. The front ends of the two barrel bodies are installed with an annular seat 116. Two sides of the seat 116 are installed with orifices 117 which are communicated with the inner barrel bodies.

The inner barrel body 12 has an outer barrel body 121, an inner barrel body 122, a helical ring 123 and a sealing block 125. It has an assembly the same as the outer cylinder body, namely, it has a flow channel B. The end portion of the sealing block 125 is installed with two coal oil openings 124, which is communicated with the flow path B. Thereby, the inner cylinder body 12 passes into the annular seat 116 of the outer cylinder body 11 and is telescopic. A receiving chamber C is formed between the two cylinders, which is communicated with the orifice 117 of the annular seat 116. Two coal oil openings 114 are formed, one of the openings has a tube 126 which is communicated with one of the coal oil opening 124.

The linear moving means 13 has a driving device 131 which may move linearly. A spindle 132 passes through the driving device 131. Thereby, the spindle 132 may move linearly and telescopically. Thereby, the driving device 131 is firmly secured to the end portion of the outer cylinder body 11 (or inversely is installed to an end portion of the inner cylinder body 12) so that the spindle 132 is firmly secured to the rear end of the inner cylinder body 12 (or the rear end of the outer cylinder body). The linear moving means 13 may push and pull the cylinder bodies 11 and 12 telescopically. Thereby, the receiving chamber C absorbs wax liquid from the two orifices 117 and then extrudes the wax liquid. Then the wax liquid is transferred to the wax injecting cylinder 4 for being injected.

With reference to FIG. 2, the coal oil heat exchanger 2 is a prior heat exchanger for reducing or increasing the temperature of the coal oil. The exchanger 2 is installed with an oil tube 21 which is communicated with the coal oil openings 114, 124 of the wax liquid temperature control cylinder 1 so as to form as a cyclic flow path. A temperature sensor 24 is installed out of the oil tube 21 at an outlet of the wax liquid temperature control cylinder 1. The coal oil heat exchanger 2 is further installed with a water tube 22 which is communicated with the water storage tank 5. An electromagnetic valve 26 is installed. Thereby, the pump 6 and the water tube 22 can suck cooling water for cooling the coal oil in the water tube 26. The coal oil heat exchanger 2 is formed with a coal oil tube 23 which is communicated with the wax storage tank 3. Therefore, the high temperature coal oil in the wax storage tank 3 can be selectively sucked for heating the wax liquid temperature control cylinder 1.

In the wax storage tank 3, high temperature coal oil serves to heat the wax so as to be formed with high temperature melt wax liquid. The wax liquid is filled in the wax injecting cylinder 4 for storage. The wax storage tank 3 is formed with a wax liquid tube 31 which is communicated with the orifices 117 of the wax liquid temperature control cylinder 1. Thus, as the wax liquid temperature control cylinder 1 telescopically moves, the wax liquid in the wax storage tank 3 can be sucked.

The wax injecting cylinder 4 is a prior injecting device for storing wax in a proper temperature before wax is injected into a mold. A wax liquid tube 41 is communicated with the orifices 117 of the wax liquid temperature control cylinder 1. Therefore, the wax liquid sucked by the wax liquid temperature control cylinder 1 may be transferred to the wax injecting cylinder 4 by the wax liquid tube. The wax injecting cylinder 4 is a prior object. Therefore, the details will not be described herein.

The water storage tank 5 is installed at an interior or an exterior of the wax injecting device. Cooling water is stored in the water storage tank 5. By the circulation flow in the water tube 22 and the coal oil heat exchanger 2, the high temperature coal oil can be cooled.

Figure 5:
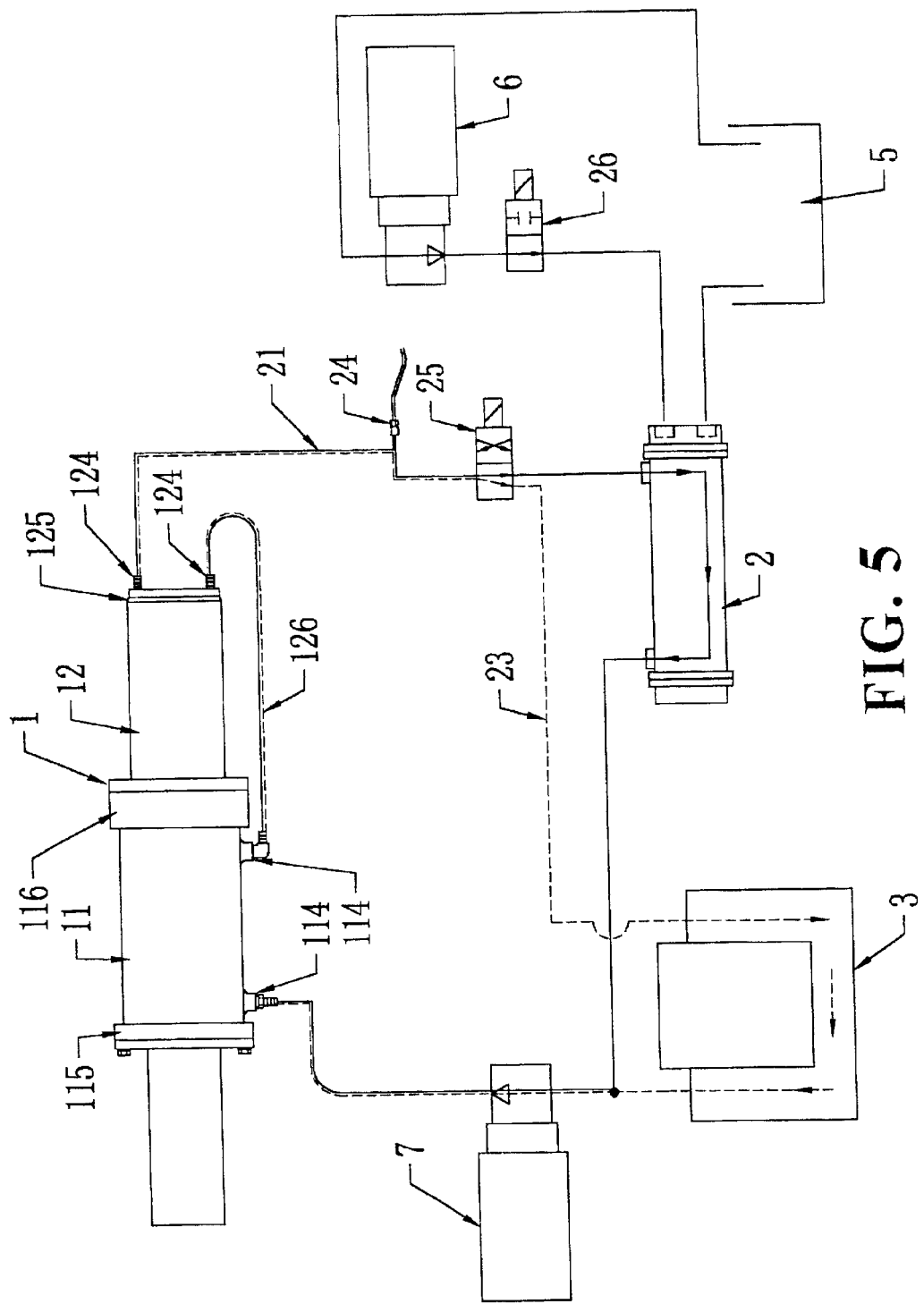
FIG. 5 is a schematic view showing the cooling and heating process of the present invention.

The oil tube 21 of the coal oil heat exchanger 2 is connected to the wax liquid temperature control cylinder 1. The coal oil openings 114, 124 of the wax liquid temperature control cylinder 1 are formed as flow paths. The water tube 22 is communicated with the water storage tank 5. The wax liquid tube 23 is communicated with the wax storage tank 3 (referring to FIGS. 2 and 5). In the present invention, when the wax liquid temperature control cylinder 1 is reduced by the inner linear moving means 13, the high temperature melt wax liquid in the wax storage tank 3 can be absorbed through the wax liquid tube 31 to enter into the receiving chamber C. Then, coal oil is transferred to the helical flow path A of the wax liquid temperature control cylinder 1 from the coal oil heat exchanger 2. The wax liquid is cooled by the cyclical flowing of the coal oil. The tube 126 between the inner cylinder body 12 and the outer cylinder body 11 cause that the coal oil flows into the flow path B to further cool the wax liquid. The heat of the wax liquid will be exhausted by the flowing the coal oil. If so, the wax liquid in the wax liquid temperature control cylinder 1 has a proper temperature for shaping injecting wax.

If the temperature of the coal oil is too high, in the present invention, the temperature sensor 24 serves to measure the temperature of the coal oil for controlling the electromagnetic valve 26 to switch the pump 6. Thereby, cooled water is transferred to the coal oil heat exchanger 2 for reducing the temperature of the coal oil. Therefore, the low temperature coal oil is utilized to cool the wax liquid in the wax liquid temperature control cylinder 1. If the temperature of the wax liquid in the wax liquid temperature control cylinder 1 is too low, the high temperature coal oil in the wax storage tank 3 is sucked by the high temperature coal oil tube 23, electromagnetic valve 25 and the pump 7 to flow into the wax liquid temperature control cylinder 1. The wax liquid is heated by the high temperature coal oil so as to have a proper temperature for being injected. If so, the wax having a proper temperature is injected to the mold from the wax injecting cylinder 4 by the wax liquid temperature control cylinder 1. Therefore, the cooling time can not be too long, and the mold can be filled with wax liquid fully. As a result, the wax can be cooled and shaped rapidly.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A wax liquid temperature control device of a wax injector comprising a wax liquid temperature control cylinder, a coal oil heat exchanger, a wax storage tank, a wax injecting cylinder, and a water storage tank; wherein the wax liquid temperature control cylinder is a device for sucking wax liquid from a wax storage tank to the wax injecting cylinder; the wax liquid temperature control cylinder includes an outer cylinder body, an inner cylinder body, and a linear moving means; the outer cylinder body has an outer barrel body; the interior of the outer barrel body is installed with an inner barrel body; a periphery of the inner barrel cylinder are enclosed by a helical ring that forms a helical flow channel for providing wax liquid to cool or heat the coal oil; thereby, the inner cylinder body is capable to be inserted into the outer cylinder body to telescopically move therein;

the coal oil heat exchanger is the heat exchanger for reducing or increasing the temperature of the coal oil; the exchanger is installed with an oil tube which is communicated with the wax liquid temperature control cylinder so as to form as a cyclic flow path; thereby, the wax liquid in the wax liquid temperature control cylinder can be cooled or heated by coal oil; the coal oil heat exchanger is further installed with a water tube which is communicated with the water storage tank; the coal oil heat exchanger is arranged with a coal oil tube which is communicated with a wax storage tank; therefore, high temperature coal oil in the wax storage tank is selectively sucked for heating the wax liquid temperature control cylinder;

the wax storage tank stores high temperature coal oil therein to heat the wax so as to form high temperature melt wax liquid; the wax liquid is filled in the wax injecting cylinder for storage; the wax storage tank is arranged with a wax liquid tube which is communicated with the wax liquid temperature control cylinder;

the wax injecting cylinder is an injecting device for storing wax in a predetermined temperature before wax is injected into a mold; the wax liquid tube is installed, therefore, the wax liquid sucked by the wax liquid temperature control cylinder is transferred to the wax injecting cylinder by the wax liquid tube;

wherein the coal oil heat exchanger controls the temperature of the coal oil in a predetermined range, then the coal oil is transferred to the wax liquid temperature control cylinder for controlling the temperature of the wax liquid so that the wax liquid is retained in a predetermined temperature for being injecting to a mold by the wax injecting cylinder so that wax liquid can fully fill the mold rapidly and is cooled rapidly.

2. The wax liquid temperature control device of a wax injector as claimed in claim 1, wherein the linear moving means has a driving device which moves linearly; a spindle passes through the driving device; thereby, the spindle moves linearly and telescopically; the linear moving means pushes and pulls the cylinder bodies telescopically; thereby, the receiving chamber absorbs wax liquid from the two orifices and then extrudes the wax liquid; then the wax liquid is transferred to the wax injecting cylinder for being injected.

3. The wax liquid temperature control device of a wax injector as claimed in claim 2, wherein thereby, the driving device is firmly secured to the end portion of the outer cylinder body and the spindle is firmly secured to a rear end of the inner cylinder body.

4. The wax liquid temperature control device of a wax injector as claimed in claim 1, wherein a temperature sensor is installed out of the oil tube at an outlet of the wax liquid temperature control cylinder for sensing the temperature of circulating oil.

5. The wax liquid temperature control device of a wax injector as claimed in claim 1, wherein an electromagnetic valve is installed for opening and closing; thereby, the pump in the water tube can suck cooling water for cooling the coal oil in the water tube.

6. The wax liquid temperature control device of a wax injector as claimed in claim 1, wherein the water storage tank is installed at the interior or exterior of the wax injecting device.

* * * * *